United States Patent
Higgins et al.

(10) Patent No.: US 9,999,833 B2
(45) Date of Patent: *Jun. 19, 2018

(54) HAND-HELD CONTROLLERS WITH CAPACITIVE TOUCH SENSORS FOR VIRTUAL-REALITY SYSTEMS

(71) Applicant: OCULUS VR, LLC, Menlo Park, CA (US)

(72) Inventors: Jason Andrew Higgins, Seattle, WA (US); Benjamin E. Tunberg Rogoza, Seattle, WA (US); Sharvil Shailesh Talati, Seattle, WA (US)

(73) Assignee: OCULUS VR, LLC, Menlo Park, CA (US)

( * ) Notice: Subject to any disclaimer, the term of this patent is extended or adjusted under 35 U.S.C. 154(b) by 303 days.

This patent is subject to a terminal disclaimer.

(21) Appl. No.: 14/737,162

(22) Filed: Jun. 11, 2015

(65) Prior Publication Data
US 2016/0361638 A1 Dec. 15, 2016

(51) Int. Cl.
| | |
|---|---|
| A63F 13/24 | (2014.01) |
| A63F 13/2145 | (2014.01) |
| B25G 1/10 | (2006.01) |
| A63F 13/825 | (2014.01) |
| A63F 9/24 | (2006.01) |
| A63F 13/00 | (2014.01) |

(52) U.S. Cl.
CPC ............. *A63F 13/24* (2014.09); *A63F 9/24* (2013.01); *A63F 13/00* (2013.01); *A63F 13/2145* (2014.09); *A63F 13/825* (2014.09); *B25G 1/102* (2013.01); *A63F 2009/2407* (2013.01); *A63F 2009/2408* (2013.01); *A63F 2009/2494* (2013.01)

(58) Field of Classification Search
CPC ........ A63F 13/24; A63F 9/24; A63F 13/2145; G06F 3/033; G06F 3/034
See application file for complete search history.

(56) References Cited

U.S. PATENT DOCUMENTS

| | | | | |
|---|---|---|---|---|
| 5,008,497 A | * | 4/1991 | Asher | G06F 3/045 178/18.05 |
| 5,159,159 A | * | 10/1992 | Asher | G01L 1/205 178/18.05 |
| 5,409,239 A | * | 4/1995 | Tremmel | H03K 17/9645 273/148 B |

(Continued)

OTHER PUBLICATIONS

"Capacitive Touch (Touch Sensing Technologies—Part 2)" published Jun. 10, 2011, accessed and printed from URL <https://web.archive.org/web/20111028165628/http://www.touchadvance.com/2011/06/capacitive-touch-touch-sensing.html>, 3 pages.*

(Continued)

*Primary Examiner* — Jason Skaarup
(74) *Attorney, Agent, or Firm* — Morgan, Lewis & Bockius LLP

(57) ABSTRACT

There is provided a hand-held controller for a virtual-reality system. The hand-held controller includes a user-input surface and a grip coupled to the user-input surface. The user-input surface includes a first user-input key situated on the user-input surface. The first user-input key includes a first capacitive touch sensor to detect a finger of a user hovering above the first user-input key and contacting the first user-input key.

19 Claims, 3 Drawing Sheets

(56) References Cited

U.S. PATENT DOCUMENTS

| | | | | |
|---|---|---|---|---|
| 5,632,679 A * | 5/1997 | Tremmel | H03K 17/9645 | 273/148 B |
| 5,855,483 A * | 1/1999 | Collins | A63F 3/00643 | 434/307 R |
| 6,297,811 B1 * | 10/2001 | Kent | G06F 3/044 | 178/18.01 |
| 6,661,239 B1 * | 12/2003 | Ozick | G01D 5/2405 | 324/658 |
| 8,823,399 B1 * | 9/2014 | Bharathan | G01R 1/00 | 324/603 |
| 8,870,654 B2 * | 10/2014 | Nakayama | A63F 13/02 | 463/37 |
| 9,110,543 B1 * | 8/2015 | Dabell | G06F 3/044 | |
| 2004/0222970 A1 * | 11/2004 | Martinez | A63F 13/06 | 345/169 |
| 2006/0111180 A1 * | 5/2006 | Cheng | A63F 13/06 | 463/36 |
| 2008/0180390 A1 * | 7/2008 | Yoshikawa | G06F 3/044 | 345/156 |
| 2010/0245239 A1 * | 9/2010 | Sternberg | A63F 13/06 | 345/156 |
| 2010/0253651 A1 * | 10/2010 | Day | G06F 3/044 | 345/175 |
| 2011/0118028 A1 * | 5/2011 | Sobel | G06F 21/32 | 463/37 |
| 2011/0205161 A1 * | 8/2011 | Myers | G06F 3/016 | 345/169 |
| 2011/0294579 A1 * | 12/2011 | Marks | A63F 13/245 | 463/36 |
| 2012/0013571 A1 * | 1/2012 | Yeh | G06F 3/044 | 345/174 |
| 2012/0050229 A1 * | 3/2012 | Tenuta | G06F 3/044 | 345/178 |
| 2012/0228111 A1 * | 9/2012 | Peterson | H03K 17/962 | 200/600 |
| 2012/0306802 A1 * | 12/2012 | McCracken | G06F 3/0416 | 345/174 |
| 2013/0141382 A1 * | 6/2013 | Simmons | G06F 3/044 | 345/174 |
| 2014/0224633 A1 * | 8/2014 | Peterson | H03K 17/962 | 200/5 A |
| 2014/0274372 A1 * | 9/2014 | Rosander | G07F 17/3209 | 463/31 |
| 2014/0354305 A1 * | 12/2014 | Hanssen | H03K 17/9622 | 324/661 |
| 2014/0354577 A1 * | 12/2014 | Hanssen | G06F 3/044 | 345/174 |
| 2015/0070604 A1 * | 3/2015 | Chen | G06F 3/044 | 349/12 |
| 2015/0153869 A1 * | 6/2015 | Kim | G06F 3/0416 | 345/174 |
| 2015/0258432 A1 * | 9/2015 | Stafford | A63F 13/213 | 463/32 |
| 2015/0286334 A1 * | 10/2015 | Simmons | G06F 3/044 | 345/174 |
| 2015/0287381 A1 * | 10/2015 | Kim | G06F 3/044 | 345/174 |

OTHER PUBLICATIONS

"Projected Capacitive Technology" published by 3M Touch Systems, on or before Dec. 31, 2013, accessed and printed from URL <http://multimedia.3m.com/mws/media/7884630/tech-brief-projected-capacitive-technology.pdf>, 8 pages.*

* cited by examiner

HAND-HELD CONTROLLERS WITH CAPACITIVE TOUCH SENSORS FOR VIRTUAL-REALITY SYSTEMS

TECHNICAL FIELD

This application relates generally to gaming entertainment and virtual-reality systems, and more specifically to hand-held controllers having capacitive touch sensors to detect one or more objects (e.g. fingers of a user) hovering above or contacting a portion of the controller (e.g. a user-input key and/or a user-input surface).

BACKGROUND

Gaming entertainment systems typically include a hand-held controller or other controller. A user manipulates the hand-held controller to send commands or other instructions to the gaming entertainment system to control a video game or other simulation. For example, the hand-held controller may be provided with several buttons or knobs operated by the user, such as a joystick.

Conventional gaming controllers typically merely provide buttons or knobs for operation by the user, where each of the buttons or knobs corresponds to a desired action to be carried out on a display of the gaming entertainment or virtual-reality system. The buttons or knobs are operated by the user applying some form of force, such as pressing, pushing or pulling the buttons or knobs in order for a desired action to be carried out in the virtual-reality system.

Pushing, pulling and pressing the user-input keys (e.g. buttons, knobs, triggers, etc. . . . ), for example results in the user having to exert a certain amount of energy to actuate the user-input keys. Constant pushing, pulling and pressing could result in ergonomic ailments to the user's fingers and wrists as a result. As such, conventional controllers lack the capability of actuating the user-input keys and/or user-input surface by a finger of a user merely hovering above or lightly touching the user-input keys and/or user-input surface. Furthermore, conventional controllers are unduly limited in the number of functions that may be associated with a user-input key.

SUMMARY

Accordingly, there is a need for hand-held controllers capable of actuating the user-input keys and/or the user-input surface by a finger of a user merely hovering above or lightly touching a respective surface, thus requiring little to no exertion to actuate the buttons. Such hand-held controllers also allow different functions to be associated with different types of actuation: for example, a first function is associated with hovering and a second function is associated with pushing, pulling, or pressing.

In accordance with some embodiments, a hand-held controller for a virtual-reality system includes a user-input surface, a first user-input key, and a grip coupled to the user-input surface. The first user-input key is situated on the user-input surface and includes a first capacitive touch sensor to detect a finger of a user hovering above the first user-input key and contacting the first user-input key.

In some embodiments, the hand-held controller further includes a cage coupled to the user-input surface. The cage has an outer surface and includes a plurality of illumination sources on the outer surface.

In some embodiments, the first capacitive touch sensor includes first and second layers, each including a plurality of conductive electrodes arranged in a pattern, and an insulating layer positioned between the first and second layers and electrically insulating the first and second layers from each other. The first capacitive touch sensor further includes a touch controller to measure self-capacitance of each of the plurality of electrodes of the first and second layers to determine a position of the finger.

In some embodiments, the first user-input key comprises a transparent material and the first layer is positioned between the first user-input key and the insulating layer.

In some embodiments, the plurality of conductive electrodes of the first and second layers comprises at least one of copper and indium tin oxide.

In some embodiments, the plurality of conductive electrodes of the first layer comprises conductive lines arranged parallel to each other, and the plurality of conductive electrodes of the second layer comprises conductive lines arranged parallel to each other. The conductive lines of the first layer are arranged perpendicular to the conductive lines of the second layer.

In some embodiments, the first capacitive touch sensor comprises a self-capacitance array.

In some embodiments, the first capacitive touch sensor further comprises a touch controller to measure self-capacitances of the self-capacitance array to determine positions of the finger.

In some embodiments, the self-capacitance array is a projected self-capacitance array.

In some embodiments, the hand-held controller further includes a plurality of user-input keys including the first user-input key. Each user-input key includes a respective capacitive touch sensor to detect a finger hovering above and touching each respective user-input key.

In some embodiments, the plurality of user-input keys is situated on the user-input surface, and respective user-input keys of the plurality of user-input keys are selected from a group consisting of a thumbstick, a button, a trigger, and a directional pad.

In some embodiments, the hand-held controller further includes a second user-input key including a second capacitive touch sensor to detect a finger of a user hovering above the second user-input key and contacting the second user-input key. The second capacitive touch sensor includes third and fourth layers, each including a plurality of conductive electrodes arranged in a pattern and an insulating layer positioned between the third and fourth layers and electrically insulating the third and fourth layers from each other. The second capacitive touch sensor further includes a touch controller to measure self-capacitance of each of the plurality of electrodes of the third and fourth layers to determine a position of the finger.

In some embodiments, the hand-held controller further includes a structural web coupling the cage to the user-input surface and the second user-input key is a trigger mounted on at least one of the structural web and the grip at a position configured to be actuated by a touch or hovering above of a middle finger of the user.

In some embodiments, the hand-held controller further includes a power source to supply power to the first capacitive touch sensor and the second capacitive touch sensor.

In some embodiments, the hand-held controller may further include a third capacitive touch sensor situated below the user-input surface to detect the finger of the user hovering above the user-input surface and contacting the user-input surface.

In some embodiments, the third capacitive touch sensor includes fifth and sixth layers, each including a plurality of conductive electrodes arranged in a pattern, and an insulating layer positioned between the fifth and sixth layers and electrically insulating the fifth and sixth layers from each other. The third capacitive touch sensor further includes a touch controller to measure self-capacitance of each of the plurality of electrodes of the fifth and sixth layers to determine a position of the finger.

In some embodiments, the user-input surface comprises a transparent material and the fifth layer is positioned between the user-input surface and the insulating layer.

In some embodiments, the hand-held controller further includes a power source to supply power to the first capacitive touch sensor and the third capacitive touch sensor.

In some embodiments, the first user-input key is selected from the group consisting of a thumbstick, a button, a trigger, and a directional pad.

In accordance with some embodiments, a hand-held controller for a virtual-reality system comprises a body comprising a user-input surface, a first user-input key and a second user-input key, each situated on the user-input surface. The hand-held controller further comprises a grip coupled to the user-input surface and a cage coupled to the body. The cage includes a plurality of illumination sources on the outer surface. The hand-held controller additionally comprises a structural web coupling the cage to the body, and a power source configured to supply power to the body and cage. The first user-input key comprises a first capacitive touch sensor to detect a finger of a user hovering above the first user-input key and contacting the first user-input key. The first capacitive touch sensor comprises first and second layers, each including a plurality of conductive electrodes arranged in a pattern, and an insulating layer positioned between the first and second layers and electrically insulating the first and second layers from each other. The plurality of conductive electrodes of each of the first and second layers are arranged parallel to each other, and the plurality of electrodes of the first layer are arranged perpendicular to the plurality of electrodes in the second layer.

In some embodiments, the second user-input key comprises a second capacitive touch sensor to detect a finger of a user hovering above the second user-input key and contacting the second user-input key. The second capacitive touch sensor comprises third and fourth layers configured similarly to the first and second layers of the first capacitive touch sensor, each including a plurality of conductive electrodes arranged in a pattern, and an insulating layer positioned between the third and fourth layers and electrically insulating the third and fourth layers from each other.

In some embodiments, the body further comprises a third capacitive touch sensor situated below the user-input surface to detect a finger of a user hovering above the user-input surface and contacting the user-input surface. The third capacitive touch sensor comprises fifth and sixth layers configured similarly to the first and second layers of the first capacitive touch sensor, each including a plurality of conductive electrodes arranged in a pattern, and an insulating layer positioned between the fifth and sixth layers and electrically insulating the fifth and sixth layers from each other.

In some embodiments, the hand-held controller further comprises a touch controller configured to measure self-capacitance of each of the plurality of electrodes of the first, second, third, fourth, fifth and sixth layers to determine a finger position.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DETAILED DESCRIPTION

Figure 1:
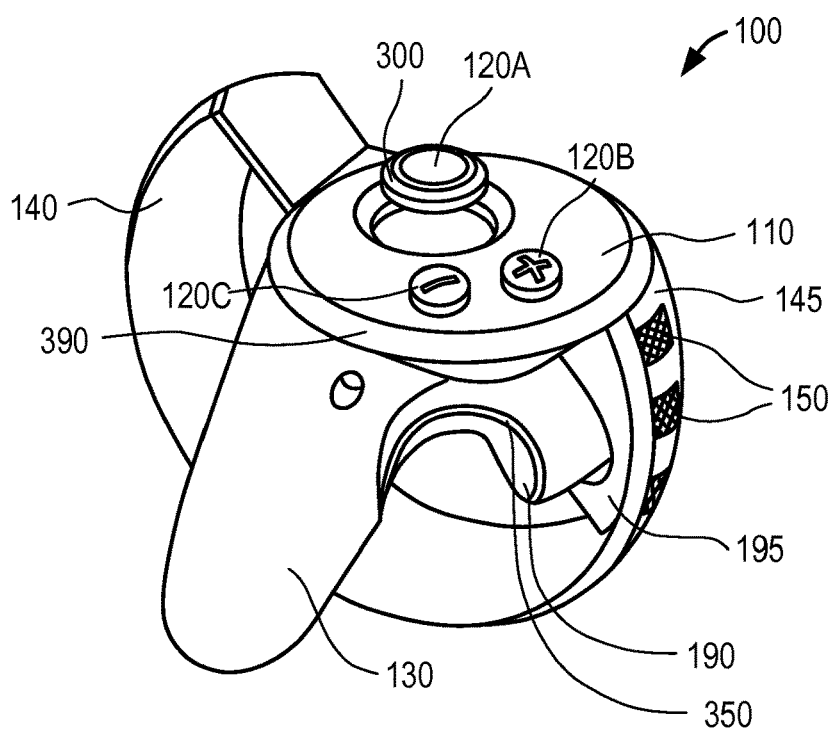
FIG. 1 illustrates an isometric view of an exemplary hand-held controller in accordance with some embodiments.

Hand-held controllers are typically held in one or both hands by a user while playing a video game or carrying out some other virtual-reality activity in order to operate the user-input keys (e.g., buttons) on the controller. Hand-held controllers typically require a certain amount of force to be used in manipulating (e.g., pressing, pushing, pulling, etc.) the various user-input keys. Continuous manipulation of the user-input keys at strenuous positions to the user's fingers may result in various ergonomic issues related to overreaching, pushing and pulling with a user's fingers. It is desirable to manipulate the various user input keys and/or user-input surface while exerting a minimum amount of user effort or force. Furthermore, it may be desirable to detect a user's finger hovering over a user-input key and associate a function with the hovering that is different from the function resulting from applying force to the user-input key.

Accordingly, the present disclosure describes hand-held controllers including capacitive touch sensors which activate various functions of user-input keys on a user-input surface as a result of a change in capacitance of the capacitive touch sensors when an object such as a user's finger hovers above or touches the user-input keys and/or the user-input surface. For example, the present disclosure describes capacitive touch sensors configured to sense an object hovering above or touching a portion of the hand-held controller (e.g., the user-input keys and/or the user-input surface) through self-capacitance (e.g., projected self-capacitance). When an object (e.g. the user's finger) hovers above and approaches electrodes of the capacitive touch sensor, the electric field of the capacitive touch sensor is disturbed, thereby causing a change in capacitance. The change in capacitance is used to detect the hovering or touching (e.g., to determine coordinates of a location of where the user's finger is hovering above or touching), which triggers activation of a user-input surface or of a user-input key corresponding to a desired action to be carried out in virtual reality.

In some embodiments a hand-held controller includes a first user-input key situated on a user-input surface and comprising a first capacitive touch sensor to detect a finger of a user hovering above the first user-input key and contacting the first user-input key. The first capacitive touch sensor may comprise first and second layers, each including a plurality of conductive electrodes arranged in a pattern and an insulating layer positioned between the first and second layers and electrically insulating the first and second layers from each other. The touch sensor may further include a touch controller configured to measure a current on each electrode to ground, i.e. the self-capacitance, of each of the plurality of electrodes of the first and second layers to determine a position of a hovering or a touch of the finger above a corresponding user-input surface or user-input keys on the user-input surface.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first user-input key could be termed a second user-input key, and, similarly, a second user-input key could be termed a first user-input key, without departing from the scope of the various described embodiments. The first user-input key and the second user-input key are both user-input keys, but they are not the same user-input key.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 2:
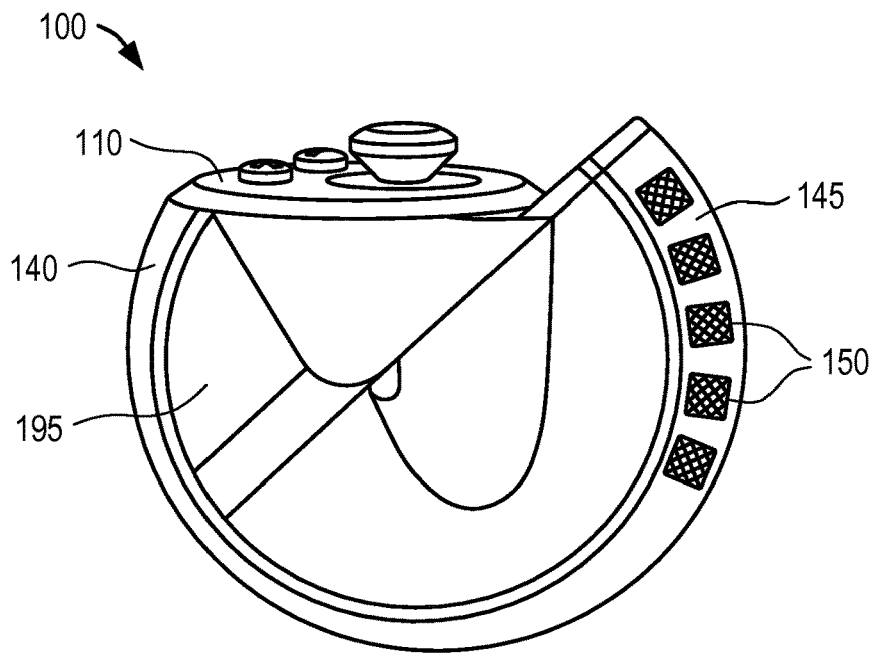
FIG. 2 illustrates another isometric view of the exemplary hand-held controller in accordance with some embodiments.

FIG. 1 and FIG. 2 illustrate a hand-held controller 100 in accordance with some embodiments. The hand-held controller 100 generally comprises a user-input surface 110, a first user-input key 120A, and a grip 130 coupled to the user-input surface 110. The first user-input key 120A is situated on the user-input surface 110 and comprises a first capacitive touch sensor 300 configured to detect a finger of a user hovering above the first user-input key 120A and contacting the first user-input key 120A.

Figure 3A:
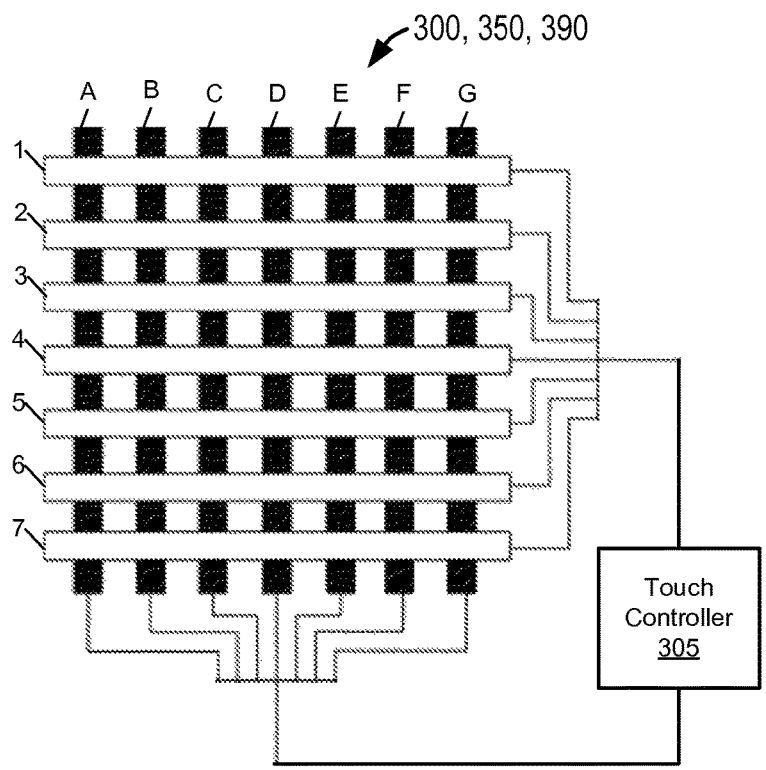
FIG. 3A illustrates a top view of a capacitive touch sensor of the exemplary hand-held controller in accordance with some embodiments.
Figure 3B:
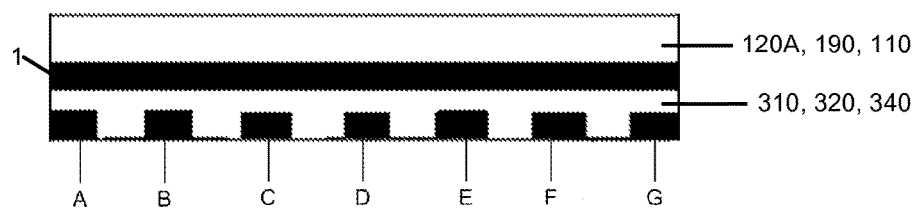
FIG. 3B illustrates a partial cross-sectional view of the capacitive touch sensor of the exemplary hand-held controller in accordance with some embodiments.

In some embodiments, the first capacitive touch sensor 300 comprises a self-capacitance array (e.g., a projected self-capacitance array). For example, the first capacitive touch sensor 300 comprises a first layer including a plurality of conductive electrodes (1-7) and a second layer, also including a plurality of conductive electrodes (A-G), as shown in FIGS. 3A and 3B. The plurality of conductive electrodes of the first layer (1-7) comprises conductive lines arranged parallel to each other, and the plurality of conductive electrodes of the second layer (A-G) also comprises conductive lines arranged parallel to each other. The conductive lines of the first layer of conductive electrodes (1-7) are arranged perpendicular to the conductive lines of the second layer of conductive electrodes (A-G) so as to form rows and columns in a grid pattern relative to each other. The first and second layers of conducting electrodes (1-7) and (A-G) include an insulating layer 310 positioned between the first and second layers to electrically insulate the first (1-7) and second (A-G) layers of conductive electrodes from each other.

In some embodiments, the first capacitive touch sensor 300 includes a touch controller 305 configured to measure self-capacitance of each of the plurality of electrodes of the first and second layers (1-7) and (A-G) respectively, to detect (e.g., determine a position of) the finger hovering above or touching the first user-input key 120A. The touch controller is configured to determine the position of the finger of a user hovering above or touching the first user-input key by determining a position where a largest change in capacitance occurs upon the finger hovering above or touching the first user-input key 120A. The touch controller of the first capacitive touch sensor 300 is configured to run through each of the conductive electrodes of the first layer (1-7) and the conductive electrodes of the second layer (A-G) (e.g., one at a time) to measure capacitance of each electrode. In some embodiments, the position of the finger hovering above or touching the first-user input key is determined by an X-axis position of an electrode having the largest change in capacitance in the second layer of conductive electrodes (A-G), and a Y-axis position of an electrode having the largest change in capacitance in the first layer of conductive electrodes (1-7). Because the capacitive touch sensor 300 is configured to take self-capacitance measurements at each electrode in accordance with some embodiments, response time of the hand-held controller to the sensing of the hovering above and touch of the first user-input key 120A is fast and sensitivity high compared to a configuration in which mutual capacitance is measured. In some embodiments, the capacitive touch sensor 300 of the present invention is configured to detect the hovering of the object (e.g., user finger) above the first user-input key 120A of up to 20 mm.

In some embodiments, the plurality of conductive electrodes of the first and second layers (1-7) and (A-G) comprise at least one of copper and indium tin oxide. The plurality of conductive electrodes (1-7) and (A-G) may comprise indium tin oxide for its transparent and conductive properties. Additionally, the electrodes may comprise copper on a flexible printed circuit board. As illustrated in FIG. 3A and FIG. 3B, the electrodes may comprise wired lines positioned in a self-capacitance grid array pattern and separated by the insulating layer 310.

In some embodiments, the first user-input key 120A comprises, but is not limited to, a transparent material and the first layer of conductive electrodes (1-7) is positioned just below a surface of the first user-input key 120A between the transparent material and the insulating layer 310. This configuration allows for increased accuracy of sensing of the hovering above the first user-input key 120A by the capacitive touch sensor 300.

In some embodiments, the hand-held controller 100 may further comprise a plurality of user-input keys 120A, 120B, and 120C, including the first user-input key 120A. Each user-input key of the plurality of user-input keys (or a subset of the plurality of user-input keys) may include a respective capacitive touch sensor (e.g., configured in the same manner as described above for the first capacitive touch sensor 300 of the first user-input key 120A), to detect a finger hovering above and touching each respective user-input key 120A, 120B, and 120C. The plurality of user-input keys 120A, 120B, and 120C is situated on the user-input surface 110. In some embodiments, user-input keys 120A, 120B, 120C are selected from the group consisting of a thumbstick, a button, a trigger, and a directional pad.

The user-input keys 120A, 120B, 120C are buttons, knobs, switches, thumbsticks, directional pads, or any other such part that a user manipulates in some way to carry out a specific action in a virtual-reality system (e.g., during gaming). In the example of FIG. 1 and FIG. 2, the user input keys 120 include a thumbstick 120A and buttons 120B and 120C. Thus, the user-input surface 110 is a surface on the controller where the user delivers an input by activating one or more user-input keys (e.g., by hovering a finger above or by touching the user-input keys 120A, 120B, and 120C) corresponding to an action that the user desires to carry out in the virtual-reality system.

Each of the user-input keys 120A, 120B, and 120C is configured to communicate with the virtual-reality system so as to translate hovering above of a user's finger and a touching of the user-input key by the user into a corresponding action in the virtual-reality system.

In some embodiments, the user-input keys 120B and/or 120C may be selected from the group consisting of an A or X button, a B or Y button, a start button, a back button, a forward button, and a home button. The A or B buttons may correspond to a selection action between at least two choices presented to the user in the gaming system. The X or Y button may correspond to a negative or affirmative decision to be made by the user dictating how the image subject will proceed in the game. X may correspond to an action of "NO" or "END" and Y may correspond to "YES" or "PROCEED/CONTINUE." The start button may be a button activated by the user to begin the virtual-reality (e.g., gaming) experience, and the back and forward buttons may indicate a direction in which the user desires the image subject to move. The home button may be a button activated to return the gaming experience back to a main menu or to start the game or activity from the beginning.

The first user-input key 120A and the other user-input keys 120B, 120C may be activated by the user finger hovering above or touching the respective user-input key 120A, 120B, 120C. In some embodiments, respective capacitive touch sensors of the user-input keys 120A, 120B, and 120C (e.g. the first capacitive touch sensor 300 of the first user-input key 120A) are configured to sense a position of the finger by determining which row and column of the conductive electrodes experiences the largest change in capacitance. Detection of the finger hovering over or touching the specific user-input key 120A, 120B, or 120C, or the sensed position of the finger hovering over or touching the specific user-input key 120A, 120B, or 120C, determines a desired action to be performed in the virtual-reality system. Each respective capacitive touch sensor (e.g. the first capacitive touch sensor 300) is configured to detect a hovering of the user's finger above the respective user-input key (e.g. 120A) of up to a specified distance (e.g., 20 mm). In some embodiments, hovering a finger above the user-input key (e.g., 120A) may activate a menu with a selection of potential actions to be carried out in virtual reality from which the user may select the desired action. This configuration provides an advantage that the user exerts little to no force activating a specific user-input key 120A, 120B, 120C as the user merely uses a finger to hover over or touch the desired user-input key. Also, the effect of hovering over a user-input key may differ from the effect of touching or applying force to the user-input key, in accordance with some embodiments.

In some embodiments, the home button is positioned further away from the other user-input keys. This configuration would allow for user-input keys that are used most (e.g. a directional pad used to dictate a direction of movement of the image subject, e.g., up-down-left-right) to be placed closer to the vicinity of the fingers and thumb. This configuration provides the advantage that the user would not need to overreach to hover a finger over or touch the more frequently used user-input keys, thereby mitigating the possibility of ergonomic ailments associated with overreaching and overstretching fingers.

In some embodiments, the hand-held controller 100 further includes a second user-input key 190 (e.g., a trigger) including a second capacitive touch sensor 350 to detect a finger of the user hovering above the second user-input key 190 and contacting the second user-input key 190. In some embodiments, the second capacitive touch sensor 350 comprises a self-capacitance array (e.g., a projected self-capacitance array). For example, the second capacitive touch sensor 350 comprises third and fourth layers, each including a plurality of conductive electrodes arranged in a pattern and configured in the same manner as the first and second conductive electrode layers (1-7) and (A-G) of the first capacitive touch sensor 300, as shown in FIGS. 3A and 3B. Similar to the first capacitive touch sensor 300, the second capacitive touch sensor 350 further includes an insulating layer 320 positioned between the third and fourth conductive electrode layers to electrically insulate the third and fourth conductive electrode layers from each other. The second capacitive touch sensor 350 additionally includes a touch controller 305 configured to measure self-capacitance of each of the plurality of electrodes of the third and fourth conductive electrode layers to detect (e.g., determine a position of) the finger (e.g., in a similar manner as the touch controller 305 of the first capacitive touch sensor 300). In some embodiments, the second capacitive touch sensor 350 shares a touch controller 305 with one or more other capacitive touch sensors (e.g., including the first capacitive touch sensor 300).

In some embodiments, the touch controller 305 of the second touch capacitive touch sensor 350 is configured to determine the position of the finger of a user hovering above or touching the second user-input key 190, in a similar manner as described above for the first touch capacitive touch sensor 300, by determining a position where a largest change in capacitance occurs upon the finger hovering above or touching the second user-input key 190. As described above for the touch controller of the first capacitive touch sensor 300, the touch controller of the second capacitive touch sensor 350 is configured to run through each of the conductive electrodes of the third layer and the conductive electrodes of the fourth layer, one at a time and configured to measure capacitance of each electrode, in accordance with some embodiments. For example, the position of the finger hovering above or touching the second-user input key is determined by an X-axis position of an electrode having the largest change in capacitance in the fourth layer of conductive electrodes, and a Y-axis position of an electrode having the largest change in capacitance in the third layer of conductive electrodes in a similar manner to change in capacitance measured in the first (1-7) and second (A-G) conductive electrode layers of the first capacitive touch sensor 300.

In some embodiments, the plurality of conductive electrodes of the third and fourth conductive electrode layers of the second capacitive touch sensor 350, similar to those of the first and second layers (1-7) and (A-G) of the first capacitive touch sensor, comprise, but are not limited to, at least one of copper and indium tin oxide. The plurality of conductive electrodes of the second capacitive touch sensor 350 may comprise indium tin oxide for its transparent and conductive properties. Additionally, the electrodes of the second capacitive touch sensor 350 may comprise copper on a flexible printed circuit board. As illustrated in FIG. 3A and FIG. 3B, the electrodes may comprise wired lines positioned in a self-capacitance grid array pattern and separated by the insulating layer 320.

In some embodiments, the second user-input key 190 comprises a transparent material and the third layer of conductive electrodes is positioned just below a surface of the second user-input key 190 between the transparent material and the insulating layer 320. This configuration allows for increased accuracy of sensing of the hovering above the second user-input key 190 by the second capacitive touch sensor 350.

In some embodiments, the user-input surface 110 further includes a third capacitive touch sensor 390 situated below the user-input surface 110 to detect a finger of the user hovering above the user-input surface 110 and contacting the user-input surface 110. In some embodiments, the third capacitive touch sensor 390 comprises a self-capacitance array (e.g., a projected self-capacitance array). For example, the third capacitive touch sensor 390 comprises fifth and sixth layers, each including a plurality of conductive electrodes arranged in a pattern and configured in the same manner as the first and second conductive electrode layers (1-7) and (A-G) of the first capacitive touch sensor 300, as shown in FIGS. 3A and 3B. Similar to the first capacitive touch sensor 300, the third capacitive touch sensor 390 further includes an insulating layer 340 positioned between the fifth and sixth conductive electrode layers and electrically insulating the fifth and sixth conductive electrode layers from each other. The third capacitive touch sensor 390 additionally includes a touch controller 305 configured to measure self-capacitance of each of the plurality of electrodes of the fifth and sixth conductive electrode layers to detect (e.g., determine a position of) the finger in a similar manner as the touch controller of the first capacitive touch sensor 300. In some embodiments, the second capacitive touch sensor 350 shares a touch controller 305 with one or more other capacitive touch sensors (e.g., including the first and/or second capacitive touch sensors 300 and 350). In some embodiments, the third capacitive touch sensor 390 is configured such that when the user's finger hovers up to a specified distance (e.g., 20 mm) above or touches the user-input surface 110, a menu is activated allowing the user to select from a number of desired actions in the virtual-reality system.

In some embodiments, the touch controller 305 of the third capacitive touch sensor 390 is configured to determine the position of the finger of a user hovering above or touching the user-input surface 110, in a similar manner as described above for the first touch capacitive touch sensor 300, by determining a position where a largest change in capacitance occurs upon the finger hovering above or touching the user-input surface 110. As described above for the touch controller of the first capacitive touch sensor 300, the touch controller of the third capacitive touch sensor 390 is configured to run through each of the conductive electrodes of the fifth layer and the conductive electrodes of the sixth layer, one at a time and configured to measure capacitance of each electrode, in accordance with some embodiments. For example, the position of the finger hovering above or touching the user-input surface 110 is determined by an X-axis position of an electrode having the largest change in capacitance in the sixth layer of conductive electrodes, and a Y-axis position of an electrode having the largest change in capacitance in the fifth layer of conductive electrodes in a similar manner to change in capacitance measured in the first (1-7) and second (A-G) conductive electrode layers of the first capacitive touch sensor 300.

In some embodiments, the plurality of conductive electrodes of the fifth and sixth conductive electrode layers of the third capacitive touch sensor 390, similar to those of the first and second layers (1-7) and (A-G) of the first capacitive touch sensor 300, comprise, but are not limited to, at least one of copper and indium tin oxide. The plurality of conductive electrodes of the third capacitive touch sensor 390 may comprise indium tin oxide for its transparent and conductive properties. Additionally, the electrodes of the third capacitive touch sensor 390 may comprise copper on a flexible printed circuit board. As illustrated in FIG. 3A and FIG. 3B, the electrodes may comprise wired lines positioned in a self-capacitance grid array pattern and separated by the insulating layer 340.

In some embodiments, the user-input surface 110 comprises, but is not limited to a transparent material and the fifth layer of conductive electrodes is positioned just below a surface of the user-input surface 110 between the transparent material and the insulating layer 340. This configuration allows for increased accuracy of sensing of the hovering above the user-input surface 110 by the third capacitive touch sensor 390.

In some embodiments, the hand-held controller 100 further comprises a power source to supply power to at least one of (e.g., to all of) the first, second and third capacitive touch sensors and any other capacitive touch sensors. The power source providing power to at least one of the first 300, second 350 and third 390 capacitive touch sensors may or may not be the same as a power source providing power to the user-input surface 110. The hand-held controller 100 may be wireless; therefore, the power source may be one or more batteries.

In some embodiments, the hand-held controller 100 further comprises a cage 140 (FIGS. 1 and 2) coupled to the user-input surface 110. The cage 140, which may also be referred to as a tracking cage, includes an outer surface 145 on which a plurality of illumination sources 150 is positioned. The illumination sources 150 are configured to be positioned to be visible to an external image-capturing device (e.g., camera), which detects movement of the illumination sources 150 when the user makes a motion (e.g., waving, swinging, punching, shaking, or any other hand motion) while holding the grip 130 of the controller 100. In some embodiments, the cage 140 is positioned such that it is located above the user hand when the user holds the grip 130 in a neutral position. Given this orientation, the outer surface 145 is configured to be visible to the image-capturing device (e.g., a forward-looking camera on a head-mounted display worn by the user, or alternatively an external camera separate from the head-mounted display). A neutral position refers to when users hold the controller 100 in front of them with the grip 130 between palm and fingers and otherwise relax their arms and wrists.

In some embodiments, the illumination sources 150 are light emitting diodes (LEDs). In some embodiments, the LEDs are infrared (IR) LEDs. The LEDs may be positioned on the outer surface 145 of the cage 140 in any suitable pattern, order, or array. For example, LEDs may be positioned linearly, in a circular pattern, a rectangular pattern, a hexagonal pattern, or any other desired pattern to provide visibility to the camera. The LEDs may be fixedly or detachably positioned on the cage 140 by any appropriate method. For example, the LEDs may be mounted on or embedded within the outer surface 145 of the cage 140. Alternatively, the LEDs may be on a sleeve that surrounds the cage 140 and effectively forms the outer surface 145 of the cage 140. Although the LEDs are described as being positioned on the outer surface 145 of the cage 140, they may additionally or alternatively be coupled to any other surface on the cage 140 and/or the rest of the controller 100. Additionally, the illumination sources 150 may be another type of illumination source (e.g., passive reflectors configured to reflect light provided by the camera back to the camera for detection of positions of the passive reflectors).

The LEDs are electrically connected to a power source which may or may not be same power source providing power to at least one of (e.g., to all of) the user-input surface 110 and the capacitive touch sensors. The hand-held controller 100 may be wireless; therefore, the power source may be one or more batteries. The LEDs may be housed in diffused cases including a current limiting resistor to keep the current from the power source to the LED below the LEDs maximum current rating so as to ensure maximum life of the LEDs. The LEDs may be activated when a suitable voltage is applied. By virtue of the LEDs being configured to be positioned in an area on the hand-held controller 100 detectable to the image capture device, motion of the light produced by the LEDs that is detected by the image capture device is used as an indication of the positions and motion of the hand-held controller 100. In this way, motion of the hand-held controller 100 is tracked by the image capture device, allowing for corresponding virtual-reality hand motions to be shown. For example, when the user makes a punching motion while playing a boxing game, movement of the LEDs in a manner corresponding to a punch may be detected and used to model the user's motion in virtual reality.

In some embodiments, the grip 130 is coupled to the user-input surface 110. The grip 130 is a protruding structure of the hand-held controller 100 which the user grips in one hand to hold the hand-held controller 100. This configuration allows for the user to be able to grip the hand-held controller 100 between a palm and fingers (e.g., three or less fingers) while freeing up the thumb and, in some embodiments, another finger (e.g. the middle finger), for operating the user-input keys 120A, 120B and 120C. In some embodiments, the middle finger is freed to operate the second user-input key 190 mounted at least in part on the grip 130.

In some embodiments the grip 130 is a separate part of the hand-held controller 100 that is removably coupled to the user input surface 110 and/or cage 140. The grip 130 and the user-input surface may be coupled by a method appropriate for their materials of construction. For example, the grip and user-input surface 110 may be formed of a hard plastic and may be coupled to each other by ultrasonic welding. Alternatively, the grip 130 and the user-input surface 110 may be coupled to each other by a fastening mechanism such as a screw or a bolt, or may be threadedly engaged with each other.

In some embodiments, the grip 130 is integrally formed with the user-input surface 110 and/or the cage 140, as one part (e.g., which may be formed from molding).

In some embodiments, the grip 130 is slanted at a predetermined angle with respect to the user-input surface 110 (e.g., with a plane through the user-input surface or a portion thereof) in order to provide a comfortable (e.g., optimum) ergonomic balance for a user between holding the grip in and using a thumb to operate the at least one user-input key.

In the example of FIG. 1 and FIG. 2, the user-input surface 110 is outward-facing with respect to the cage 140. Alternatively, the user-input surface 110 may be inward-facing with respect to the cage 140. For example, in some embodiments the user-input surface 110 forms an inner front surface of the cage 140 or is contiguous with the inner surface of the cage 140.

In some embodiments, the cage 140 may be formed of an over-molded rubber material so as to provide a surface providing sufficient friction with a user's palm thus improving the grip. In some embodiments, the cage 140 may be formed of a hard plastic, including, but not limited to high density polyethylene providing increased rigidity in structure. Additionally, any other suitable materials may be used.

In some embodiments, the cage 140 may be detachably coupled to at least one of the user-input surface 110 and the grip 130. The cage 140 may be slidably coupled to the user-input surface 110 through a protrusion spanning a width of each end portion of the cage 140 being slidably engaged with a corresponding groove positioned on an outer circumference of the user-input surface 110. The cage 140 may be coupled to the grip 130 through a fastening mechanism such as a bolt, a screw or the like. The detachable configuration of the cage 140 to the grip 130 or the user-input surface 110 yields the advantage of separating the aforementioned components for calibration as necessary. Detachable coupling of the components also allows for a separate and potentially cheaper manufacturing process of the parts. Furthermore, detachable coupling of the cage 140 to at least one of the user-input surface 110 and the grip 130 allows for separation thereof upon dropping of the hand-held controller 100, thereby reducing the need to replace the entire unit upon damage, but instead focus on fixing/replacing the separate damaged part.

In some embodiments, as illustrated in FIG. 1 and FIG. 2, the hand-held controller 100 may further comprise a structural web 195 coupling the cage 140 to the user-input surface 110. The structural web 195 provides further rigidity in structure to the coupling between the cage 140 and the user-input surface 110 to mitigate damage and separation of these components upon dropping of the hand-held controller 100 by the user.

In some embodiments, the user-input key 190 is a trigger mounted at least in part on the structural web 195. That is, the trigger 190 may be mounted between the structural web 190 and the grip 130. This configuration yields the advantage that the trigger is positioned adjacent to a location of a user's finger (e.g., middle finger) when the grip 130 is held in the neutral position.

In some embodiments, a hand-held controller for a virtual-reality system comprises a body further comprising a user-input surface 110, a first user-input key 120A and a second user-input key 190, each situated on the user-input surface 110. The hand-held controller 100 further comprises a grip 130 coupled to the user-input surface 110 and a cage 140 coupled to the body. The cage includes a plurality of illumination sources 140 on the outer surface 145. The hand-held controller 100 additionally comprises a structural web 195 coupling the cage 140 to the body, and a power source configured to supply power to the body and cage.

In some embodiments, the first user-input key 120A comprises a first capacitive touch sensor 300 to detect a finger of a user hovering above the first user-input key 120A and contacting the first user-input key 120A. The first capacitive touch sensor 300 comprises, for example first and second layers (1-7) and (A-G), each including a plurality of conductive electrodes arranged in a pattern, and an insulating layer 310 positioned between the first and second layers (1-7) and (A-G) and electrically insulating the first and second layers from each other. The plurality of conductive electrodes of each of the first and second layers are arranged parallel to each other, and the plurality of electrodes of the first layer (1-7) are arranged perpendicular to the plurality of electrodes in the second layer (A-G).

In some embodiments, the second user-input key 190 comprises a second capacitive touch sensor 350 to detect a finger of a user hovering above the second user-input key 190 and contacting the second user-input key 190. The second capacitive touch sensor 350 comprises, for example, third and fourth layers configured similarly to the first and second layers of the first capacitive touch sensor 300, each including a plurality of conductive electrodes arranged in a pattern, and an insulating layer 320 positioned between the third and fourth layers and electrically insulating the third and fourth layers from each other.

In some embodiments, the body further comprises a third capacitive touch sensor 390 situated below the user-input surface 110 to detect a finger of a user hovering above the user-input surface 110 and contacting the user-input surface. The third capacitive touch sensor 390 comprises, for example, fifth and sixth layers configured similarly to the first and second layers of the first capacitive touch sensor 300, each including a plurality of conductive electrodes arranged in a pattern, and an insulating layer 340 positioned between the fifth and sixth layers and electrically insulating the fifth and sixth layers from each other.

In some embodiments, the hand-held controller 100 further comprises a touch controller 305 (or alternatively, a plurality of touch controllers 305) configured to measure self-capacitance of each of the plurality of electrodes of the first, second, third, fourth, fifth and sixth layers to determine a finger position. The touch controller 305 is configured to run through each of the conductive electrodes of the first and second layers, the conductive electrodes of the third and fourth layers, and the conductive electrodes of the fifth and sixth layers (e.g., one at a time) to measure capacitance of each electrode. In some embodiments, the position of the finger hovering above or touching the second-user input key is determined by an X-axis position of an electrode having the largest change in capacitance in either of the second, fourth or sixth layers of conductive electrodes, and a Y-axis position of an electrode having the largest change in capacitance in either of the first, third or fifth layers of conductive electrodes.

Figure 4:
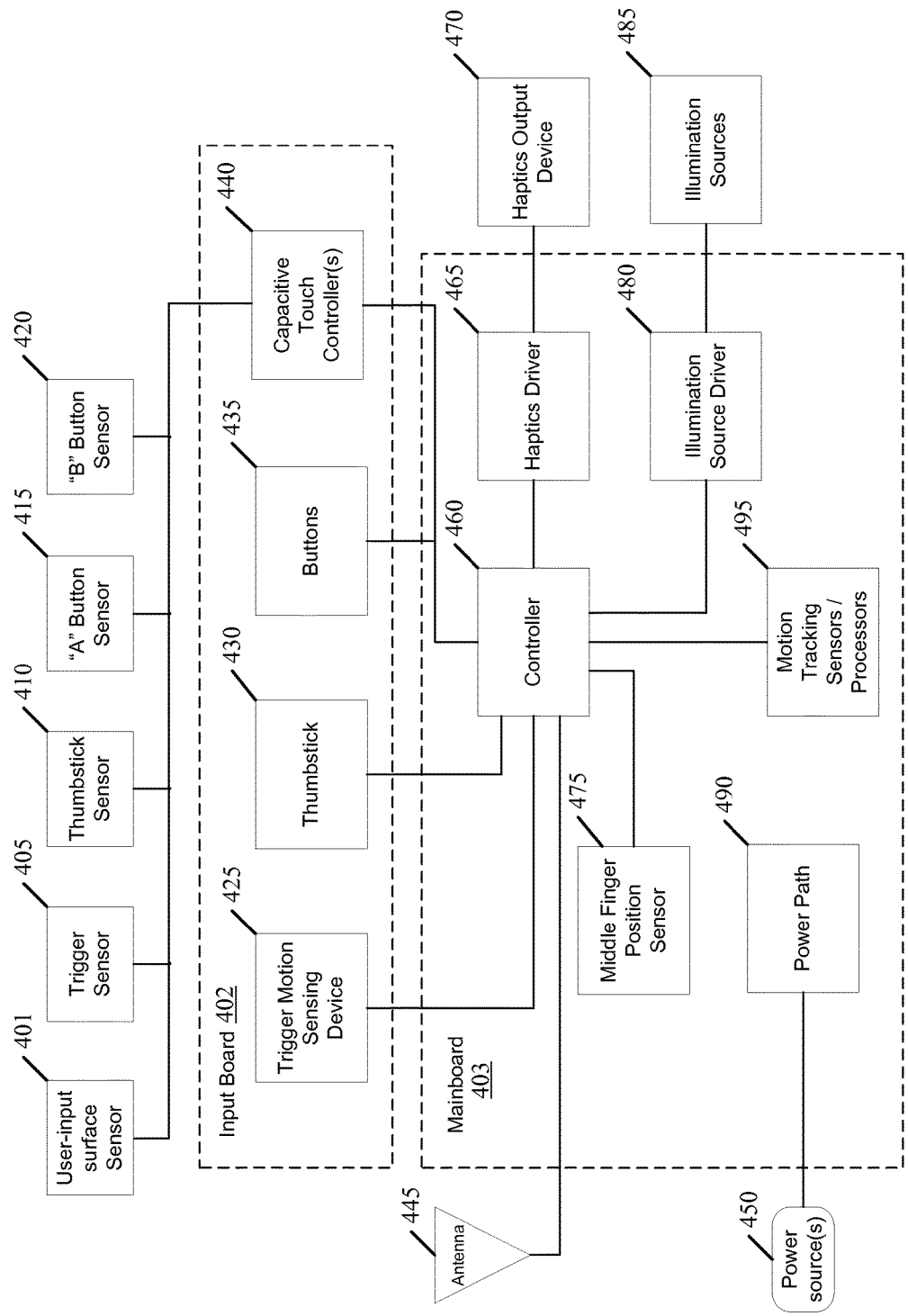
FIG. 4 is a block diagram illustrating an electrical configuration of the exemplary hand-held controller having at least one capacitive touch sensor in accordance with some embodiments.

FIG. 4 is a block diagram illustrating an electrical configuration of an exemplary hand-held controller (e.g., hand-held controller 100) in accordance with some embodiments. The hand-held controller includes an input board 402 and a main board 403 coupled to the input board 402. The input board 402 includes a trigger motion sensing device 425, a thumbstick 430, buttons 435, and at least one capacitive touch controller 440. In other examples, the input board 402 may include additional or alternative user-input keys. The trigger motion sensing device 425 detects user activation of a trigger (e.g., trigger 190).

The capacitive touch controller(s) 440 is/are coupled to multiple capacitive touch sensors such that the input board 402 receives sensed signals from capacitive touch sensors resulting from a user's finger hovering above or touching a portion (e.g. user-input surface 110, and/or user input-keys 120A, 120B, 120C, and 190) of the hand-held controller 100. For example, the capacitive touch sensors include the first capacitive touch sensor 300 (e.g. thumbstick sensor 410), the second capacitive touch sensor 350 (e.g. a trigger sensor 405), the third capacitive touch sensor 390 (e.g. a user-input surface sensor 401) and capacitive touch sensors for various user-input keys (e.g. an "A" button sensor 415, and/or a "B" button sensor 420). For example, first capacitive touch sensor (thumbstick sensor 410) may sense when the user's finger hovers up to a specified distance (e.g., 20 mm) above or touches the thumbstick. Similarly, the second capacitive touch sensor (trigger sensor 405) senses a signal resulting from the user's finger hovering up to a specified distance (e.g., 20 mm) above or touching the trigger 190. Further, the button sensors 415 and 420 sense signals resulting from the user's fingers hovering above or touching the "A" and "B" buttons. Various other capacitive touch sensors may be included for other user-input keys (e.g., a directional pad). In some embodiments, the capacitive touch controller 440 is configured to determine a position of the user's finger by identifying an X-axis electrode and Y-axis electrode position where a largest change in capacitance occurs.

The mainboard 403 includes a controller 460, a haptics driver 465, a middle finger position sensor 475, power path 490, motion tracking sensors/processors 495 and an illumination source driver 480. The haptics driver 465 drives a haptics output device 470 that provides haptic effects. An example of the haptics output device 470 includes a short vibration feedback device that, when activated, causes the hand-held controller to vibrate. Additionally, the haptics device may be configured for use with the capacitive touch sensors, thereby providing a vibration feedback to the user of the determined location of the user's finger corresponding to a desired action to be carried out in virtual reality.

The mainboard 403 may be coupled to an antenna to wirelessly receive and transmit signals. The hand-held controller (e.g., hand-held controller 100) thus may be wireless. The mainboard 403 may also be coupled to a power source 450 to provide power supply to the controller 460. The power may be supplied to the mainboard 403 through a power path 490.

The illumination source driver 480 (e.g., LED driver) drives illumination sources 485 (e.g., LEDs on the outer surface of the cage 140) under the control of the controller 460, and thus turns the illumination sources 485 on or off.

The middle finger position sensor 475 senses a position of the middle finger (e.g. when a user activates the trigger 190) and this information is processed by the controller 460. The motion tracking sensors/processors 495 include a plurality of motion sensors (e.g. accelerometers and/or gyroscopes) which tracks motion of the hand-held controller based on motions made by the user.

Some embodiments are directed to two hand-held controllers—one to be held in each of a user's hands. In some embodiments, the two hand-held controllers may be identical, but for a position of at least one of the user-input keys, so as to be adapted specifically for either a left or right hand in which the hand-held controller is to be held. The first hand-held controller thus may be a right-handed controller and the second hand-held controller may be a left-handed controller. In other embodiments, the two hand-held controllers may be agnostic with respect to handedness (e.g., with both hand-held controllers having the same configuration of user-input keys, or with one hand-held controller having a configuration of user-input keys different than the other).

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A hand-held controller for a virtual-reality system, the hand-held controller comprising:
    a user-input surface;
    a grip coupled to the user-input surface;
    a cage having a ring shape that is coupled to the user-input surface at first and second points, without the grip being interposed between the cage and the first point, and without the grip being interposed between the cage and the second point, the cage including a plurality of illumination sources on an outer surface of the cage; and
    a first user-input key situated on the user-input surface and comprising a first capacitive touch sensor to detect a finger of a user hovering above the first user-input key and contacting the first user-input key.

2. The hand-held controller of claim 1, wherein the first capacitive touch sensor comprises:
    first and second layers, each including a plurality of conductive electrodes arranged in a pattern;
    an insulating layer positioned between the first and second layers and electrically insulating the first and second layers from each other; and
    a touch controller to measure self-capacitance of each of the plurality of electrodes of the first and second layers to determine a position of the finger.

3. The hand-held controller of claim 2, wherein the first user-input key comprises a transparent material and the first layer is positioned between the first user-input key and the insulating layer.

4. The hand-held controller of claim 2, wherein the plurality of conductive electrodes of the first and second layers comprises at least one of copper and indium tin oxide.

5. The hand-held controller of claim 2, wherein:
    the plurality of conductive electrodes of the first layer comprises conductive lines arranged parallel to each other;
    the plurality of conductive electrodes of the second layer comprises conductive lines arranged parallel to each other; and
    the conductive lines of the first layer are arranged perpendicular to the conductive lines of the second layer.

6. The hand-held controller of claim 1, wherein the first capacitive touch sensor comprises a self-capacitance array.

7. The hand-held controller of claim 6, wherein the first capacitive touch sensor further comprises a touch controller to measure self-capacitances of the self-capacitance array to determine positions of the finger.

8. The hand-held controller of claim 6, wherein the self-capacitance array is a projected self-capacitance array.

9. The hand-held controller of claim 1, further comprising a second user-input key including a second capacitive touch sensor to detect a finger of a user hovering above the second user-input key and contacting the second user-input key, wherein the second capacitive touch sensor comprises:
    third and fourth layers, each including a plurality of conductive electrodes arranged in a pattern;
    an insulating layer positioned between the third and fourth layers and electrically insulating the third and fourth layers from each other; and
    a touch controller to measure self-capacitance of each of the plurality of electrodes of the third and fourth layers to determine a position of the finger.

10. The hand-held controller of claim 9, wherein:
    the cage is coupled to the user-input surface;
    the hand-held controller further comprises a structural web coupling the cage to the user-input surface; and
    the second user-input key is a trigger mounted on at least one of the structural web and the grip at a position configured to be actuated by a touch or hovering above of a middle finger of the user.

11. The hand-held controller of claim 9, further comprising a power source to supply power to the first capacitive touch sensor and the second capacitive touch sensor.

12. The hand-held controller of claim 1, further comprising a third capacitive touch sensor situated below the user-input surface to detect the finger of the user hovering above the user-input surface and contacting the user-input surface.

13. The hand-held controller of claim 12, wherein the third capacitive touch sensor comprises:
    fifth and sixth layers, each including a plurality of conductive electrodes arranged in a pattern;
    an insulating layer positioned between the fifth and sixth layers and electrically insulating the fifth and sixth layers from each other; and
    a touch controller to measure self-capacitance of each of the plurality of electrodes of the fifth and sixth layers to determine a position of the finger.

14. The hand-held controller of claim 12, wherein the user-input surface comprises a transparent material and the fifth layer is positioned between the user-input surface and the insulating layer.

15. The hand-held controller of claim 12, further comprising a power source to supply power to the first capacitive touch sensor and the third capacitive touch sensor.

16. The hand-held controller of claim 1, further comprising a plurality of user-input keys including the first user-input key,
    wherein each user-input key includes a respective capacitive touch sensor to detect a finger hovering above and touching each respective user-input key.

17. The hand-held controller of claim 16, wherein:
    the plurality of user-input keys is situated on the user-input surface; and
    respective user-input keys of the plurality of user-input keys are selected from a group consisting of a thumbstick, a button, a trigger, and a directional pad.

18. The hand-held controller of claim 1, wherein the first user-input key is selected from the group consisting of a thumbstick, a button, a trigger, and a directional pad.

19. A hand-held controller for a virtual-reality system, the hand-held controller comprising:
    a body comprising:
    a user-input surface;
    a first user-input key situated on the user-input surface and comprising a first capacitive touch sensor to detect a finger of a user hovering above the first user-input key and contacting the first user-input key, wherein the first capacitive touch sensor comprises:

first and second layers, each including a plurality of conductive electrodes arranged in a pattern; and an insulating layer positioned between the first and second layers and electrically insulating the first and second layers from each other, and wherein the plurality of conductive electrodes of each of the first and second layers are arranged parallel to each other, and the plurality of electrodes of the first layer are arranged perpendicular to the plurality of electrodes in the second layer;

a second user-input key situated on the user-input surface and comprising a second capacitive touch sensor to detect a finger of a user hovering above the second user-input key and contacting the second user-input key, wherein the second capacitive touch sensor comprises:

third and fourth layers, each including a plurality of conductive electrodes arranged in a pattern; and an insulating layer positioned between the third and fourth layers and electrically insulating the third and fourth layers from each other;

a third capacitive touch sensor situated below the user-input surface to detect a finger of a user hovering above the user-input surface and contacting the user-input surface, wherein the third capacitive touch sensor comprises:

fifth and sixth layers, each including a plurality of conductive electrodes arranged in a pattern; and an insulating layer positioned between the fifth and sixth layers and electrically insulating the fifth and sixth layers from each other;

a touch controller configured to measure self-capacitance of each of the plurality of electrodes of the first, second, third, fourth, fifth and sixth layers to determine a finger position;

a grip coupled to the user-input surface;

a cage having a ring shape that is coupled to the user-input surface at first and second points, without the grip being interposed between the cage and the first point, and without the grip being interposed between the cage and the second point, the cage including a plurality of illumination sources on an outer surface of the cage;

a structural web coupling the cage to the body; and a power source configured to supply power to the body and cage.

* * * * *